UNITED STATES PATENT OFFICE.

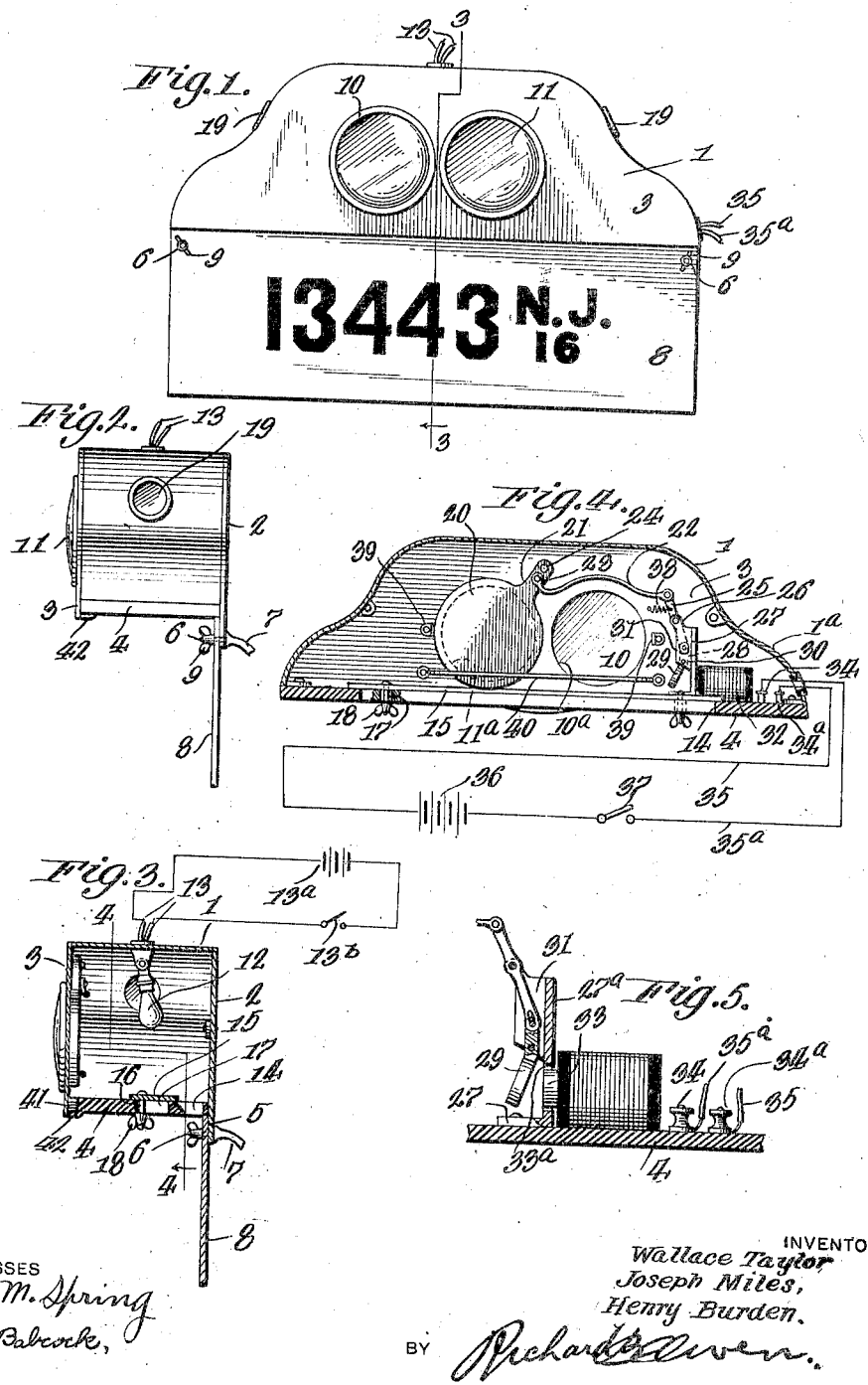

WALLACE TAYLOR, JOSEPH MILES, AND HENRY BURDEN, OF NEWARK, NEW JERSEY.

SIGNALING MEANS.

1,307,710.   Specification of Letters Patent.   Patented June 24, 1919.

Application filed November 27, 1916.   Serial No. 133,743.

*To all whom it may concern:*

Be it known that we, WALLACE TAYLOR, JOSEPH MILES, and HENRY BURDEN, citizens of the United States, residing at Newark, in the county of Essex and State of New Jersey, have invented certain new and useful Improvements in Signaling Means, of which the following is a specification.

This invention relates to signaling means, and more particularly to an automobile signal adapted to be used as a tail light for an automobile and also for illuminating the automobile license tag.

One of the main objects of the invention is to provide a device of the character stated of simple construction and operation which may be actuated so as to disclose a green running light or, in the event of making a turn or stopping, a red danger signal. A further object to provide simple and efficient means for changing or actuating the device so as to display either light, optionally, such means being of simple construction and controlled by electro-magnetic means the controlling switch of which may be positioned within reach of the driver's hand. A still further object is to provide a device of the character stated of simple construction and operation which may be produced at relatively low cost having means for controlling the illumination of the license tag. Further objects will appear from the detailed description.

In the drawings:

Figure 1 is a front view of a signaling device constructed in accordance with our invention, Fig. 2 is a side view, Fig. 3 is a section on line 3—3 of Fig. 1, Fig. 4 is a section taken substantially on line 4—4 of Fig. 3, and Fig. 5 is a detail of the electro-magnetic operating means.

The sheet metal casing 1 is of approximately rectangular shape having its lower portion flared as at 1ª. This casing is provided with the back plate 2, the front plate 3, and the bottom plate 4, this bottom plate being made of fiber or other suitable insulating material. The back plate 2 extends downward beyond bottom plate 4 to provide a longitudinally extending flange 5. This flange is provided with suitable spaced openings to receive the reduced threaded studs 6 formed at the upper ends of the bracket arms 7 which are secured to the automobile or vehicle body. The license tag 8 is also provided with spaced openings which are adapted to register with the openings through flange 5, suitable wing nuts 9 being threaded on to the studs 6 thus securing the casing 1 and the tag 8 in operative position, with the tag closely adjacent the bottom of the casing.

The front plate 3 of casing 1 is provided with an opening in which is set a red lens 11, a green lens 10 being also secured in front plate 3 closely adjacent lens 10. An electric light bulb 12 is pivotally suspended from the top of casing 1, at the approximate center thereof, as shown in Fig. 3, and is connected by wires 13 to the opposite sides of a suitable source of electric energy such as a battery or generator carried by the automobile. By this means the interior of the casing is lighted so as to illuminate either one or the other of the lenses 10 and 11, which one depending upon the position of the operating shutter to be later described.

The bottom plate 4 of casing 1 is provided, adjacent its inner edge, with a longitudinally extending slot 14. This slot permits the light rays from the casing 1 to flow downward on to the face of tag 8 so as to illuminate the same thus rendering the license number clearly visible. A plate 15 is mounted on the inner face of bottom plate 4 adjacent the slot 14. An adjusting screw 16 is secured through this plate adjacent each end and extends downward through a corresponding transverse slot 17 through bottom plate 4. A wing nut 18 is threaded on each of the screws 16 and is adapted to engage the bottom plate so as to secure plate 15 in binding engagement therewith. By this means plate 15 may be quickly and easily adjusted so as to vary the effective width of slot 14 thus permitting variation of the amount of illumination of the license tag as desired, in conjunction with the pivotal adjustment of the light bulb, so that the rays will not shine below the sign. The casing 1 is further provided, at each end, with a suitable opening in which is secured a red lens 19. This lens will show red at all times thus displaying the danger signal which is visible from either side of the vehicle, in the usual manner and especially when turning.

For the purpose of shifting from the green to red, or vice versa, a suitable disk-like shutter 20 is provided. This shutter is provided with an integral stem 21 which is pivoted to the front plate 3 of the casing midway between the openings 10ª and 11ª for the lenses 10 and 11. An operating arm 22 is pivotally secured at its inner end to the stem 21, as at 23 a short distance below the pivot point 24 of the shutter. The outer end of this arm is pivotally secured to the upper end of an operating lever 25 which is pivotally mounted at its approximate center between two spaced ears 26 extending upward from a rectangular bracket 27 secured to the bottom plate 4. The lower end of lever 25 is secured by pin and slot connections to the upper end of an arm 28 which is formed integral with, and disposed at an angle to, a disk-like armature 29. This arm 28 is pivotally mounted, as at 30, adjacent its juncture with the armature 29, between the spaced arms 31 carried by brackets 27. An electro-magnet 32 is mounted on bottom plate 4 of the casing in back of the vertical arm of bracket 27. The pole 33 of this magnet extends through a suitable opening 33ª in the vertical arms 27ª of bracket 27 so as to normally be closely adjacent the outer face of armature 29. The ends of the coil of this electro-magnet are connected to suitable binding posts 34 and 34ª which are connected by wires 35 and 35ª to the opposite sides of the electric battery 36 or other suitable source of electric energy. A suitable switch 37 is interposed in the circuit of magnet 32. By operating the switch so as to close the circuit of battery 36 the magnet 32 will be energized. When magnet 32 is energized it will attract its armature 29. This results in swinging the arm 28 downward and inward which throws the upper end of lever 25 outward thus pulling the rod 22 toward the end of casing 1. This results in swinging the shutter 20 from in front of the red lens 11 and covering the green lens 10. As a result of this, the device is actuated by means of the electro-magnet so as to uncover the danger signal 11 and cover the green running light 10. The normal position of the shutter 20 is in front of the red lens 11, so as to display normally a green light when running, but the red light when standing or stopping. A tension coil spring 38 has one end secured to the lever 25 above its pivotal point and the other end secured to the front plate 3 of casing 1. This spring acts to pull the rod 22, and consequently the shutter 20, inward so as to move the shutter in front of the red lens. To insure that the shutter will at all times be in proper position in front of one of the lenses, after being moved in either direction, a stop 39 is secured to the inner face of front plate 3 of the casing adjacent the outer side of each of the lens openings. The shutter engages this stop so as to have its movement positively limited thereby, the stop being so placed relative to the lens opening that the shutter will be maintained in front of the lens.

To insure a light-tight closure between the outer face of the shutter and the inner face of the front plate 3, a guide bar 40 is secured to the front plate at each end and is bent so as to be spaced a distance away from the plate corresponding approximately to the thickness of the shutter. This bar is so placed as to receive the lower portion of the shutter during its movement from one operative position to the other, and insures that the shutter will be held in close frictional contact with the inner face of plate 3 thus insuring that the light will pass through but one of the front lenses 10 or 11. To permit proper operation of the shutter 20 the bottom plate 4 is provided, adjacent its front edge, with a central longitudinally extending slot 41 which is closed by a block 42 secured to the under face of plate 4. This permits operation of the shutter without unduly increasing the height of casing 1, and also prevents interference with the illumination of the tag through slot 14.

By our invention we have provided a casing of light and durable construction which is specially adapted to be secured above a license tag so as to illuminate the same and also to be used either as a running light or a danger signal, in combination with simple and efficient means for changing from one signal to the other, optionally. It will be evident that there can be slight changes made in the details of the construction and arrangement of the various parts of our invention without departing from the field and scope of the same, and we intend to include all such variations, as fall within the scope of the appended claim, in this application in which a preferred form only of our invention is disclosed.

What we claim is:

In signaling means, the combination of a casing adapted to have a license tag secured to its lower inner edge, said casing being provided with two spaced openings through its front plate and a longitudinally extending slot through its bottom plate adjacent the inner edge thereof, means for regulating the effective width of said slot, lenses mounted in said openings through the front plate of the casing, a shutter pivotally secured to the front plate of the casing adjacent said lenses, means for normally holding the shutter in position to cover one of said lenses, means for moving the shutter into position to cover the other said lens, an indicating lens mounted upon the casing, and a lamp provided therewithin.

In testimony whereof we affix our signatures in presence of two witnesses.

WALLACE TAYLOR.
JOSEPH MILES.
HENRY BURDEN.

Witnesses:
ROBERT F. COCHRANE,
CHARS. C. BENDER.